United States Patent [19]
Bulgrien

[11] Patent Number: 5,101,943
[45] Date of Patent: Apr. 7, 1992

[54] METHOD OF CONTROLLING INCHING CLUTCHES

[75] Inventor: Garth H. Bulgrien, Ephrata, Pa.

[73] Assignee: Ford New Holland, Inc., New Holland, Pa.

[21] Appl. No.: 621,159

[22] Filed: Nov. 30, 1990

[51] Int. Cl.$^5$ .............................................. B60K 41/22
[52] U.S. Cl. .............................. 192/3.63; 192/109 F; 364/424.1
[58] Field of Search ............................ 192/3.63, 109 F; 364/424.1

[56] References Cited

U.S. PATENT DOCUMENTS

| | | | |
|---|---|---|---|
| 3,946,760 | 3/1976 | Murakami et al. | 192/109 F X |
| 4,086,994 | 5/1978 | Hirosawa et al. | 192/109 F |
| 4,865,176 | 9/1989 | Blake et al. | 192/3.63 |
| 4,871,048 | 10/1989 | Chatterjea | 192/109 F X |

Primary Examiner—Rodney H. Bonck
Attorney, Agent, or Firm—Griffin Branigan & Butler

[57] ABSTRACT

A method of controlling an inching clutch in response to movement of an inching clutch pedal between up and down positions in a power shift transmission comprises, for clutch pedal positions below a limiting position, applying to the clutch a control signal which is non-linearly dependent upon the position of the pedal and, for clutch pedal positions above the limiting position, applying to the clutch a control signal which linearly increases with time and is entirely independent of clutch pedal position. Within one range of clutch pedal positions below the limiting position, the magnitude of the control signal applied to the clutch is constant when a high gear speed ratio has been selected, and varies linearly with the clutch pedal position when a low gear speed ratio has been selected. Within a range of pedal positions adjacent the fully down position, the control signal remains constant regardless of the position of the pedal.

9 Claims, 4 Drawing Sheets

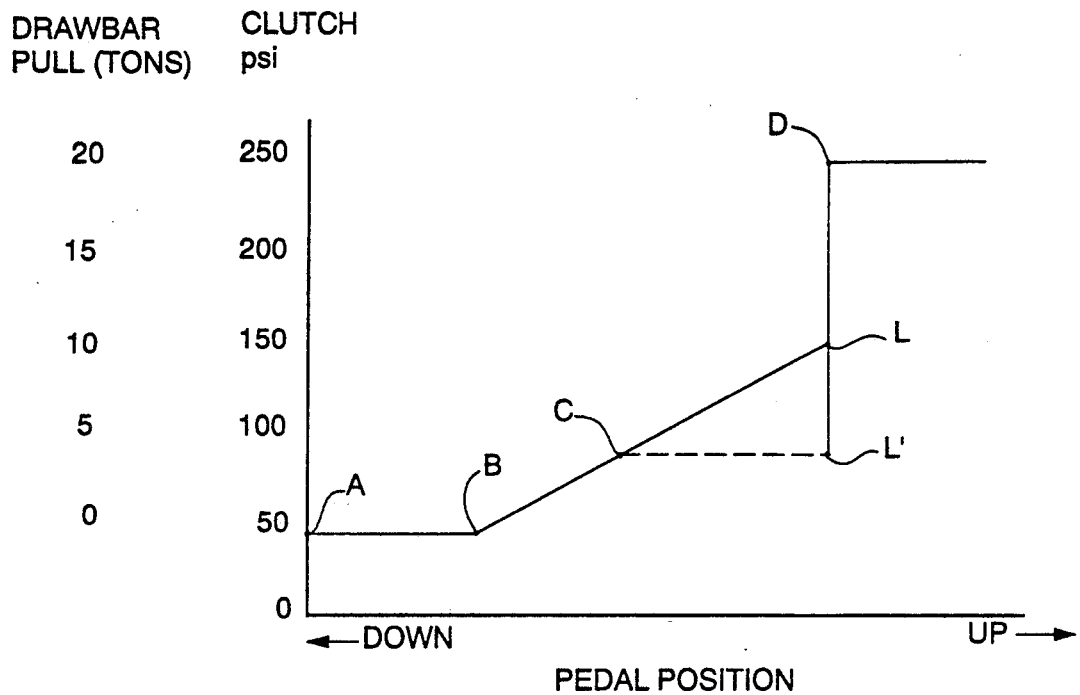
Fig. 4
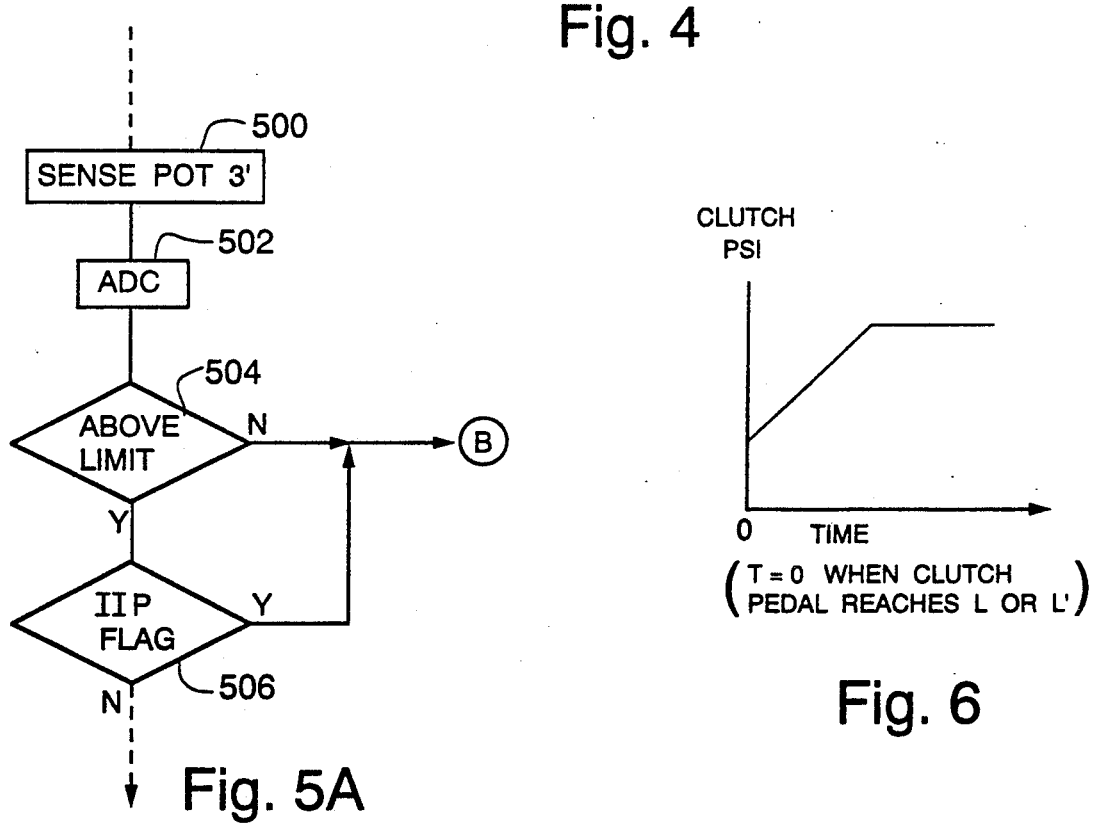
Fig. 5A
Fig. 6

METHOD OF CONTROLLING INCHING CLUTCHES

CROSS-REFERENCE TO RELATED APPLICATIONS

This application is related to my copending application Ser. No. 07/444,312 filed Dec. 1, 1989, the disclosure of which is incorporated herein by reference.

FIELD OF THE INVENTION

The present invention relates to a method of clutch control in power shift transmissions of the type disclosed in my copending patent application Ser. No. 07/444,312 filed Dec. 1, 1989. More particularly the invention provides a method of increasing clutch durability by limiting the control range of the inching clutch.

BACKGROUND OF THE INVENTION

Non-power shift transmissions in agricultural tractors require starting from a rest position in the gear that will be used for the operation. The reason for this is that when performing some operations, such as soil tillage, de-clutching to shift up allows the tractor to stop. Almost all tractors use a plate type clutch, and because of the requirement that the tractor be able to start under full load, the clutch must be capable of absorbing or dissipating full engine power for some time to provide acceptable durability.

Full power shift transmissions such as that described in my copending application Ser. No. 07/444,312 do not have the same requirements. With tractors having transmissions of this type, the operator normally downshifts to start under heavy loads, or under other conditions where he would slip the clutch on a non-power shift transmission. However, most current power shift transmissions allow using the clutch pedal in an inching function just like a regular clutch pedal in a non-power shift transmission, and the clutches are designed to handle the same conditions as described above.

Some power shift transmission clutches are not designed to handle these conditions and a control system is used which automatically shifts the transmission to low gear when the tractor stops. While this effectively protects the clutch from abuse, it is inconvenient for some operations.

SUMMARY OF THE INVENTION

It is an object of this invention to provide a method of clutch control which permits clutch pedal use in high gears, but prevents clutch abuse if the operator attempts to start the vehicle from rest in a high gear and under heavy load.

Another object of the present invention is to provide a method of clutch control which improves clutch durability or life by limiting the maximum continuous power absorbed by the clutch when the operator is using the clutch pedal.

Still another object of the invention is to provide a method of clutch control which permits the use of smaller, less expensive clutches for transmitting a predetermined torque.

Still another object of the invention is to provide a method of inching clutch control in a power shift transmission having a plurality of gear speed ratios selectable by actuation of clutches, at least one of the clutches being an inching clutch responsive to the position of a clutch pedal for controlling the torque applied to an output shaft, the clutch pedal controlling means responsive to the position of the clutch pedal over a range of positions extending between a down position and an up position for producing an analog signal which is a function of the position of the clutch pedal, the method comprising: for a first range of clutch pedal positions between the down position and the up position, converting the analog signal to a second signal which varies as the clutch pedal moves through the first range of clutch pedal positions; applying the second signal to the inching clutch; and, when the clutch pedal is positioned between a limit position above the first range and the up position, generating a control signal which varies independently of the clutch pedal position; and applying the control signal to the inching clutch whereby the torque applied to the output shaft is increased.

Yet another object of the invention is to provide a clutch control method as described above and further comprising the step of stopping variation of the control signal when the torque applied to the output shaft reaches a maximum value.

A further object of the invention is to provide a clutch control method as described above wherein the step of generating the control signal comprises generating a control signal which varies with respect to time.

Still a further object of the invention is to provide a clutch control method as described above and further comprising the step of, when the clutch pedal is in positions falling within a second range of clutch pedal positions that is between the first range and the limit position, applying a control signal of constant magnitude to the inching clutch if a high gear speed ratio has been selected.

Yet a further object of the invention is to provide a clutch control method as described above further comprising the step of, when the clutch pedal is in positions falling within the second range and a low gear speed ratio has been selected, applying to the inching clutch a control signal which is related to the clutch pedal position within the second range.

A further object of the invention is to provide a clutch control method as described above and further comprising the step of, when the clutch pedal is in a position between the down position and the first range of positions, applying to the inching clutch a control signal of constant magnitude regardless of the position of the clutch pedal.

Other objects of the invention will become apparent upon consideration of the following description and the accompanying drawings.

BRIEF DESCRIPTION OF THE DRAWINGS

FIG. 4 is a graphic plot showing clutch pedal position versus clutch pressure and useful in explaining the invention;

FIGS. 5A and 5B are flow diagrams of a microprocessor program which may be utilized to practice the invention; and FIG. 6 is a graphic plot of time versus clutch pressure when the clutch pedal is above the limit position L or L' of FIG. 4.

DETAILED DESCRIPTION OF THE INVENTION

Figure 1:
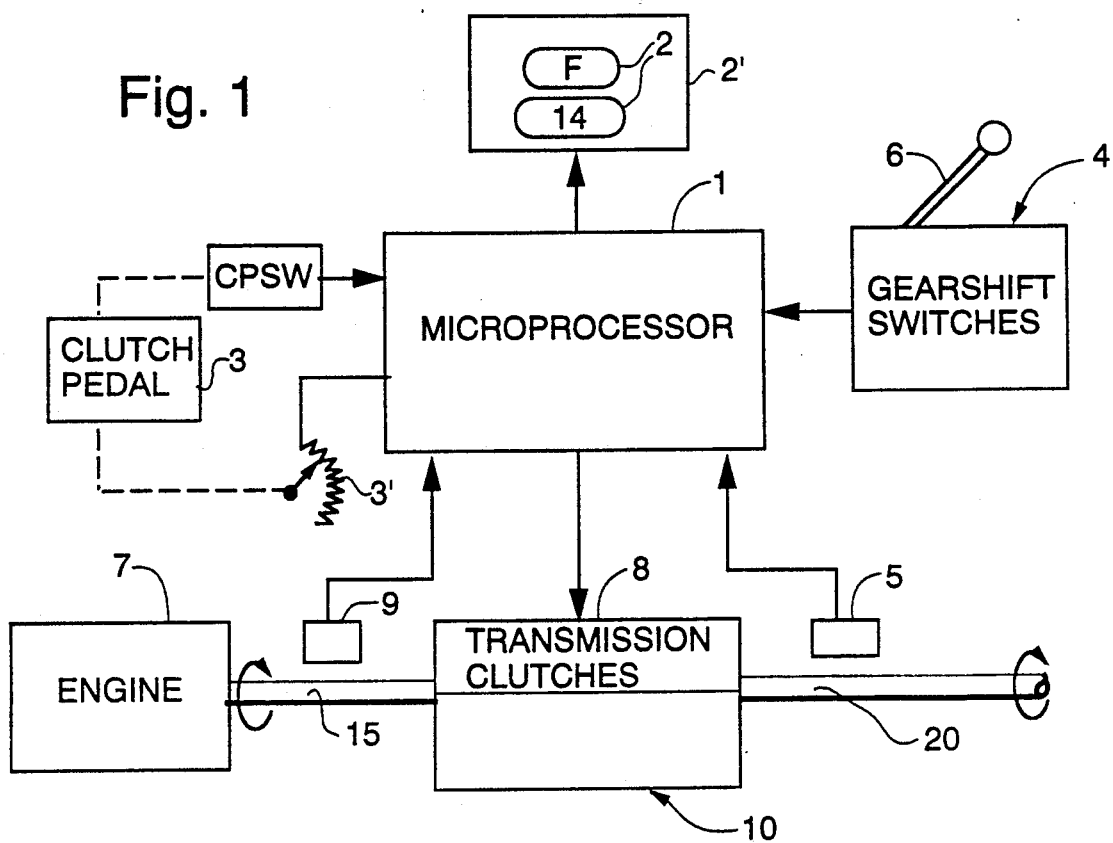
FIG. 1 is a schematic diagram of a power shift transmission system suitable for use in practicing the invention.

FIG. 1 illustrates the power shift transmission system as shown in my aforementioned application. The power shift transmission system includes a microprocessor 1, a display 2 on an operator's control panel 2', a plurality of gearshift switches 4 which are selectively actuated by manually moving a gearshift lever 6, and a plurality of transmission clutches 8 associated with a transmission 10 which transmits power from a rotating power input shaft 15 to a power output or vehicle drive shaft 20. An engine 7 unidirectionally rotates shaft 15 and a sensor 9 senses rotation of shaft 15 to provide output signals indicating the speed of engine 7. A sensor 5 senses rotation of shaft 20 to provide output signals representing vehicle speed. An operator-actuated inching clutch pedal 3 controls a potentiometer 3' and an analog output signal from the potentiometer is applied to microprocessor 1 to develop modulating signals which are applied to a final set of clutches in transmission 10. The clutch pedal 3 also actuates a clutch pedal switch CPSW when the pedal is depressed to its limit of travel.

The gearshift switches 4 are Hall-effect switches or similar devices which are actuated by a magnet or magnets carried on the gearshift lever 6. Microprocessor 1 periodically samples the clutch pedal switch, the output of potentiometer 3', the switches 4, and the outputs of the speed sensors 5 and 9, and in response to the sensed conditions controls transmission clutches 8 to "select gears", i.e. select the direction and rate of rotation of output shaft 20 relative to input shaft 15.

Figure 2:
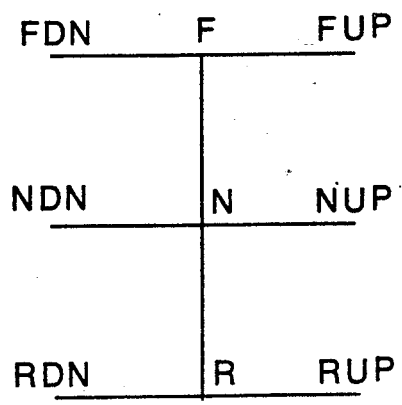
FIG. 2 is a plan view of the gearshift lever shift pattern.

FIG. 2 is a plan view of the path over which the gearshift lever 6 may be manually moved to selectively actuate the gearshift switches 4. In the neutral position N the microprocessor controls the transmission clutches 8 so that no power is transmitted from input shaft 15 to output shaft 20. The microprocessor also controls the display 2 so that the letter N is displayed, indicating to the operator that the transmission is in neutral.

The gearshift lever 6 may be moved forwardly (upwardly in FIG. 2) from the neutral position to a forward position F. When the microprocessor senses that the gearshift lever is the forward position it energizes clutches 8 so that rotation of the power input shaft is transmitted to the output shaft in one of eighteen different forward speed ratios. The manner in which this is accomplished will be evident from the description of transmission 10 set forth below. At the same time, the microprocessor sends signals to display 2 so that it displays the letter F and a numeric value between one and eighteen. The display thus indicates to the operator that his transmission is in a forward gear, and further indicates which gear.

When the gearshift lever 6 is in the forward position F it may be moved laterally to change forward gears. When the gearshift lever is moved to its rightmost extent of travel in the forward position it actuates a switch. This position is designated the FUP position. The microprocessor 1 periodically samples the switches 4 and, when the gearshift lever 6 is in the FUP position, the microprocessor periodically changes the clutches 8 which are energized so that the speed ratio between output shaft 20 and input shaft 15 increases. When the highest forward gear (18) is reached, the microprocessor continues to energize the clutches 8 to keep the transmission in gear 18 even though the gearshift lever 6 continues to actuate the FUP switch. As the microprocessor 1 controls the transmission clutches 8 it also controls the display 2 to indicate forward gear (F) and which forward gear (1-18) the transmission is in.

In like manner, the gearshift lever 6 may be moved laterally to the left in the forward position to downshift the transmission. In the forward downshift position FDN the lever 6 actuates one of gearshift switches 4. The microprocessor periodically downshifts the transmission 10 by controlling clutches 8, and as the transmission is shifted downwardly the microprocessor controls display 2 to indicate that the transmission is in forward gear and which forward gear. By holding the lever 6 in the forward downshift position the operator may downshift the transmission one gear at a time until forward gear 1 is reached. At this time, the microprocessor continues to output signals to the transmission clutches 8 to select forward gear 1 even though the gearshift lever 6 is held in the FDN position.

When the gearshift lever 6 is in the reverse position R, it may be moved laterally to the right to increase the reverse gear speed ratio of transmission 10, or moved laterally to the left to decrease the reverse gear speed ratio. At each limit of travel, designated the RUP and RDN positions respectively, gearshift switches 4 are actuated to control the microprocessor 1 for upshifting or downshifting the reverse gear speed. As long as the gearshift lever is in the reverse position the display 2 displays the letter R to indicate reverse gear and also displays a number between 4 and 12 indicating which reverse gear the transmission is in. There are 9 reverse gears, the lowest being fourth gear and the highest being twelfth gear.

The gearshift lever 6 is biased so that if it is in the FUP or FDN position it returns to the F position when manual force is removed. In like manner, if the lever is in the RUP or RDN position and force is removed, the lever returns to the R position. In addition, the gearshift lever 6 is provided with a lift collar (not shown). In shifting between the forward and reverse gear positions, the collar must be lifted. Otherwise, movement of the gearshift lever is stopped at the neutral position.

A gear speed may be preselected when the gearshift lever 6 is in the neutral position. Preselection of a gear speed is made possible by providing for lateral movement of the gearshift lever 6 in the neutral position. At its leftmost or rightmost extent of travel, designated the NDN and NUP positions, respectively, the gearshift lever 6 actuates gearshift switches 4 to signal microprocessor 1 that it is in the NDN or NUP position.

Briefly, the operator accomplishes preselection of gears by placing the gearshift lever in neutral and selectively moving the gearshift lever between the NUP, NDN and N positions to increment or decrement the displayed gear value until it agrees with the gear he wishes to select. The operator may then move the gearshift lever to the F or the R position and the microprocessor will control the transmission clutches 8 to place the transmission in the preselected gear.

Figure 3:
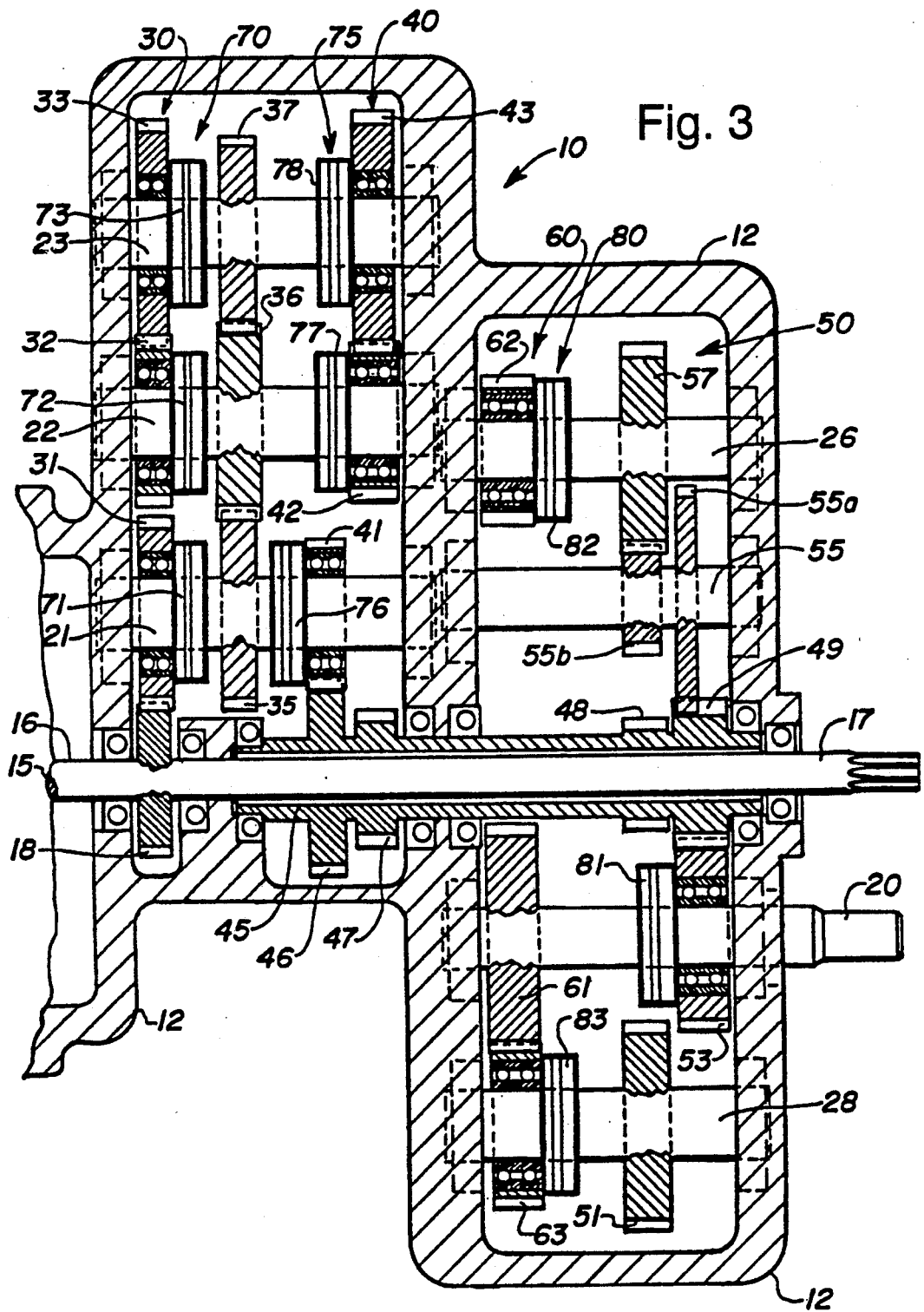
FIG. 3 is a schematic planar development of a three-dimensional transmission.

FIG. 3 is a schematic planar development of the three-dimensional transmission. Reference may be made to my above-referenced application for a complete description of the transmission, the following brief description being provided only to illustrate a suitable apparatus for practicing the present invention.

As shown in FIG. 3, the transmission 10 includes an exterior casing 12 forming a framework for supporting the power input shaft 15 rotatably journalled on the casing 12 at a central location extending entirely through the transmission 10 from an engine end 16, which receives rotational power directly from the engine 7, to a drive end 17 at the opposing end of the transmission 10, which can be used as a power takeoff shaft. The transmission includes a first jack shaft 21, a second jack shaft 22, a third jack shaft 23, a fourth jack shaft 26, a fifth jack shaft 28, the shaft 55 of a double transfer gear and the output shaft 20. Each of shafts 20, 21, 22, 23, 26, 28 and 55 is journalled by bearings rotatably supporting the respective shafts for rotation within the casing 12.

The power input shaft 15 is provided with a drive pinion 18 splined thereto for rotation therewith at the engine end 16 of the power input shaft 15. The drive pinion 18 is drivingly engaged with a primary drive gear set 30. More specifically, the drive pinion 18 is directly engaged with a first drive gear 31 rotatably mounted on the first jack shaft 21 for rotation independently of the first shaft 21. The drive pinion 18 is also directly engaged with a third drive gear 33 rotatably mounted on the third jack shaft 23 for rotation relative thereto. The third drive gear 33 is meshed in engagement with a second drive gear 32, which in turn is rotatably mounted on the second jack shaft 22. Each of the drive gears 31, 32 and 33 is journalled by bearings mounted on their respective jack shafts and driven by the power input shaft 15 by virtue of direct or indirect engagement with the drive pinion 18. Each of the drive gears 21, 22 and 23 is sized differently to provide different speeds of rotation thereof when rotated by the drive pinion 18.

Each of the jack shafts 21, 22 and 23 is provided with a corresponding fixed gear 35, 36 and 37, respectively. The second fixed gear 36 is drivingly engaged with both the first fixed gear 35 and the third fixed gear 37 so that the rotation of any one of the jack shafts 21, 22 and 23 will effect a simultaneous rotation of all the other jack shafts 21, 22 and 23. Since all the fixed gears 33, 36 and 37 are identical in size, the first jack shaft 21, the second jack shaft 22 and the third shaft 23 will rotate at identical speeds.

The transmission 10 is also provided with an intermediate gear set 40 corresponding to the primary drive gear set 30 and including a first intermediate gear 41 mounted on the first jack shaft 21 for rotation relative thereto, a second intermediate gear 42 rotatably mounted on the second jack shaft 22, and a third intermediate gear 43 rotatably supported on the third jack shaft 23. The intermediate gears 41, 42 and 43 are differently sized to effect a different speed ratio particularly when combined with the differently sized drive gears 31, 32 and 33 of the primary drive gear set 30, as Will be described in greater detail below. The first and third intermediate gears 41, 43 are engaged with a transfer hub assembly 45 as will be described below, while the second intermediate gear 42 is drivingly engaged with the third intermediate gear 43. Like the primary drive gear set 30, each intermediate gear 41, 42 and 43 is journalled by bearings mounted on the corresponding jack shaft 21, 22 and 23 to permit independent rotation therebetween.

The intermediate gear set 40 is engaged with a transfer hub assembly 45 rotatably supported from the casing 12 concentric with the power input shaft 15. The transfer hub assembly 45 includes a first transfer gear 46 drivingly engaged with the first intermediate gear 41 and a second transfer gear 47 drivingly engaged with the third intermediate gear 43. The transfer hub assembly 45 is also provided with a co-joined third transfer gear 48 and fourth transfer gear 49 to transfer rotational power from the intermediate gear set 40 to a transfer gear set 50.

The third transfer gear 48 is drivingly engaged with a reverse transfer gear 51 fixed to the fifth jack shaft 28. Likewise, a high-speed transfer gear 53 is rotatably journalled on the power output shaft 20. A double transfer gear 55 having a shaft-like configuration and integral gear members 55a and 55b is rotatably supported in the casing 12. The gear member 55a is also drivingly engaged with the fourth transfer gear 49, while the gear member 55b is engaged with a low-speed transfer gear 57 fixedly secured for rotation with the fourth jack shaft 26.

A final drive gear set 60 includes a high-speed final gear 61 rigidly secured to the power output shaft 20 for rotation therewith, a low-speed final gear 62 rotatably journalled by bearings on the fourth jack shaft 26 for rotation independently relative thereto, and a reverse final gear 63 rotatably journalled on the fifth jack shaft 58 for rotation relative thereto. The final drive gear set 60 is interengaged for simultaneous rotation such that the high-speed final gear 61 fixed to the power output shaft 20 is operatively intermeshed with both the low-speed final gear 62 and the reverse final gear 63.

The transmission includes three clutch sets 70, 75 and 80 operable to effect rotation of the various gears rotatably mounted on jack shafts. The initial clutch set 70 includes a first clutch 71 mounted on the first jack shaft 21, a second clutch 72 mounted on the second jack shaft 22 and a third clutch 73 mounted on the third jack shaft 23. Each clutch 71, 72 73 of the initial clutch set 70 is operable to engage the corresponding drive gear 31, 32 and 33 to effect rotation of the corresponding jack shaft 21, 22 and 23 with the corresponding drive gear 31, 32 and 33 at the speed the drive gear is rotating. Likewise, an intermediate clutch set 75 includes first, second and third intermediate clutches 76, 77 and 78, respectively, mounted on the first, second, and third jack shafts 21, 22 and 23, respectively, for engagement with the corresponding intermediate gear 41, 42 and 43 at the speed a which the corresponding jack shaft is being driven.

A final clutch set 80 includes a high-speed final clutch 81 mounted on the power output shaft 20 and engageable to couple the high-speed transfer gear 53 to the high-speed final gear 61 when so engaged. The final clutch set 80 also includes a low-speed final clutch 82 mounted on the fourth jack shaft 26 to effect a coupling, when engaged, between the low-speed transfer gear 57 and the low-speed final gear 62. Likewise, the final clutch set 80 also includes a reverse final clutch 83 mounted on the fifth jack shaft 28 for selectively coupling the reverse transfer gear 51 to the reverse final gear 63. To attain any given speed of rotation of the power output shaft 20 for a given speed of rotation of the power input shaft, only one selected clutch of each clutch set 70, 75, 80 is engaged at a time. The engagement of two clutches of any one clutch set 70, 75 and 80 has the effect of locking the transmission 10.

With all of the components of the transmission 10 situated as described above, transmission 10 can transmit a given engine speed received by the engine end 16 of the power input shaft 15 to the output shaft 20 in twenty-seven different speed variations with eighteen forward speeds and nine reverse speeds. It can be seen that the drive pinion 18 constantly delivers rotational power from the engine to the primary gear set 30 such that the first, second, and third drive gears 31, 32 and 33 are constantly driven with the drive pinion 18 relative to the respective jack shaft 21, 22 and 23 on which the gears of the primary drive gear set 30 are respectively mounted. The engagement of one of the clutches 71, 72 and 73 of the initial clutch set 70 effects an engagement of the corresponding drive gear 31, 32 or 33 with the respective jack shaft 21, 22 or 23 and effects rotation of the jack shafts 21, 22 and 23 at the speed at which the corresponding drive gear is being rotated. Since the intermeshed fixed gears 35, 36 and 37 are of identical size, rotation of any one of the jack shafts 21, 22 and 23 will effect rotation of all three jack shafts 21, 22 and 23 at identically the same speed as the drive gear 31, 32 and 33 engaged by the selected clutch of the initial clutch set 70.

The engagement of one of the clutches of the initial clutch set 70 will effect a corresponding rotation of the first, second, and third jack shafts 21, 22 and 23 at a selected speed corresponding to the corresponding drive gear from the primary drive gear set 30. A subsequent engagement of one of the clutches 76, 77 and 78 of the intermediate clutch set 75 effects an engagement between the corresponding intermediate gear from the intermediate gear set 40 with the rotating jack shaft corresponding to the selected intermediate clutch at the speed at which the jack shafts 21, 22 and 23 are rotating. Since all of the intermediate gears of the intermediate gear set 40 are engaged with the transfer hub assembly 45, directly or indirectly, which in turn is engaged with the transfer gear set 50, an engagement of one of the clutches of the intermediate clutch set 75 effects a rotation of all gears of the intermediate gear set 40, the transfer hub assembly 45, all of the transfer gears 46, 47, 48 and 49 and all of the gears in the transfer gear set 50, as well as the corresponding rotation of both the fourth and fifth jack shafts 26, 28 due to a fixed engagement with the corresponding transfer gears 51, 57.

Finally, an engagement of one of the clutches 81, 82 and 83 of the final clutch set 80 will transfer rotational power from the corresponding transfer gear to the corresponding final gear 61, 62 and 63 of the final drive gear set 60 to cause a rotation of the power output shaft 20 at the speed ratio corresponding to the combination of the respective gears engaged by the activated clutches of the initial clutch set 80.

The torque transmitting elements of the clutches in transmission 10 are hydraulically actuated to transfer torque. Solenoid operated valves (not shown) control the pressure applied to clutch plates and thus the torque transferred to the output shaft 20 to move the vehicle.

The clutches 81, 82 and 83 in the final clutch set 80 serve as inching clutches. As explained in my aforementioned application, clutches in the transmission may be calibrated after a tractor has been assembled or when the tractor is serviced. During calibration, the microprocessor stores a digital value $I_S$ where $I_{MAX} > I_S > I_{MIN}$. The digital value $I_S$ represents the magnitude of a pulse width modulated current signal which, when applied to a solenoid of a solenoid operated valve, allows hydraulic fluid controlled by the valve to apply to the clutch plate a pressure just less than that required to transmit torque through the clutch. A separate value $I_S$ is stored for each clutch.

$I_{MAX}$ represents the maximum current signal which may be applied to a clutch solenoid. The hydraulic pressure applied to a clutch varies inversely with respect to the current applied to the solenoid of the clutch. Thus, when a current $I = I_{MAX}$ is applied to a clutch solenoid, the lowest hydraulic pressure is applied to the clutch plate and when a current $I = I_{MIN}$ is applied to the solenoid the maximum hydraulic pressure is applied to the clutch plate.

In the transmission system described above, it is possible for an operator to preselect a gear while in neutral, and then shift into that gear while depressing the clutch pedal 3. Subsequently, he may slowly release the clutch pedal. As the clutch pedal is released, the potentiometer 3' produces an analog output signal which is a function of the clutch pedal position. This analog signal is applied to microprocessor 1 which uses it to modulate $I_S$. The microprocessor converts the signal to a digital signal $I_{CP}$ and subtracts it from the stored digital value representing $I_S$. The resulting digital value is then used by the microprocessor to generate the pulse width modulated current signal I which is applied to the solenoid of clutch 81, 82 or 83, depending upon the gear which was preselected.

As the clutch pedal is released, $I_{CP}$ increases, thereby causing a decrease in I and thus an increase in the hydraulic pressure applied to the clutch plate, so that a higher torque is applied to output shaft 20. Initially, the clutch may slip, the degree of slippage being dependent on the gear (gear speed ratio) which has been preselected, the position of the clutch pedal, and the drawbar load of the tractor in which the transmission is located. Power from engine 7 is dissipated as friction-generated heat in the clutch thus wearing the clutch and heating the transmission oil. Subsequently, as the clutch pedal is further released so that the pressure exerted by the clutch plate is increased, slippage of the clutch will decrease. Unless the load on the drawbar exceeds the capacity of the clutch, a point will be reached such that the pressure exerted by the clutch is sufficient to prevent slippage.

From the foregoing explanation it is evident that the operator may utilize clutch pedal 3 to slip a clutch regardless of the gear selected or the load on the drawbar. In accordance with the principles of the present invention a portion of the inching clutch pedal control is removed from the control of the operator by making the clutch control independent of clutch pedal position under clutch conditions of high horsepower.

FIG. 4 is a graph illustrating inching clutch pedal position verses clutch pressure and drawbar pull. When the pedal is fully down (point A) and for a first range of pedal positions between points A and B the clutch pressure remains constant at a low value. Thus, during initial upward movement of the clutch pedal no torque is transmitted to the output shaft 20.

As the clutch pedal is further released to move through a second range of pedal positions between B and L, the output of the clutch pedal potentiometer 3' is used to modulate I so that the clutch pressure increases generally linearly as the pedal position changes. As the operator releases the clutch pedal above point L, he loses inching clutch control. Microprocessor 1 takes over and automatically and repeatedly decrements I so that within a short interval of 1 to 2 seconds, the hydraulic pressure applied to the clutch is raised to its maximum value. That is, the clutch pressure is generally linearly increased as shown in FIG. 6. The ramp between points L and D is chosen to be gentle enough to avoid excessive jerkiness at the full pressure point L as the microprocessor assumes full control, but steep enough to limit the clutch slip time and consequent clutch damage.

While the response indicated by the line ABCLD is suitable when the lowest gear speed has been selected, clutch damage could result under a heavy drawbar load if a higher gear speed has been selected. Therefore, in accordance with one aspect of the invention the response to clutch pedal position may be modified as indicated by the curve ABCL'D so that at higher gear speeds the clutch pedal control is further restricted. At higher gears, the clutch pressure remains constant over the range of pedal positions from point C to point L'. At point L' the microprocessor 1 takes over as previously described and automatically modulates I so that the clutch pressure increases as shown in FIG. 6 and maximum clutch pressure is exerted within 1 to 2 seconds.

From FIG. 4 it is seen that the operator can inch at light or no-load conditions and can use the clutch pedal to start a heavy load, but cannot find a clutch pedal position where the clutch is required to slip continuously at high horsepower.

The microprocessor response to the clutch pedal may be implemented in different ways. For example, the microprocessor may be programmed to execute routines as illustrated in FIGS. 5A and 5B.

The microprocessor 1 periodically interrupts (at intervals of say 5 milliseconds) any routine it is executing and performs a routine during which it sequentially samples the outputs from the gearshift switches 4, sensors 5 and 9, potentiometer 3' and switch CPSW. As shown in FIG. 5A, the analog output of potentiometer 3' is sensed at step 500 and at step 502 the microprocessor converts the analog signal to an 8-bit digital value representing the pedal position. At step 504 this digital value is tested to determine if the pedal is in a position higher than that corresponding to the pressure limit point. This may be accomplished by accessing a location which stores a value corresponding to the L and L' positions of the pedal. The value in the accessed memory location is then compared with the digital pedal position signal derived at step 502 to determine if the pedal is above the limit position.

Figure 5B:
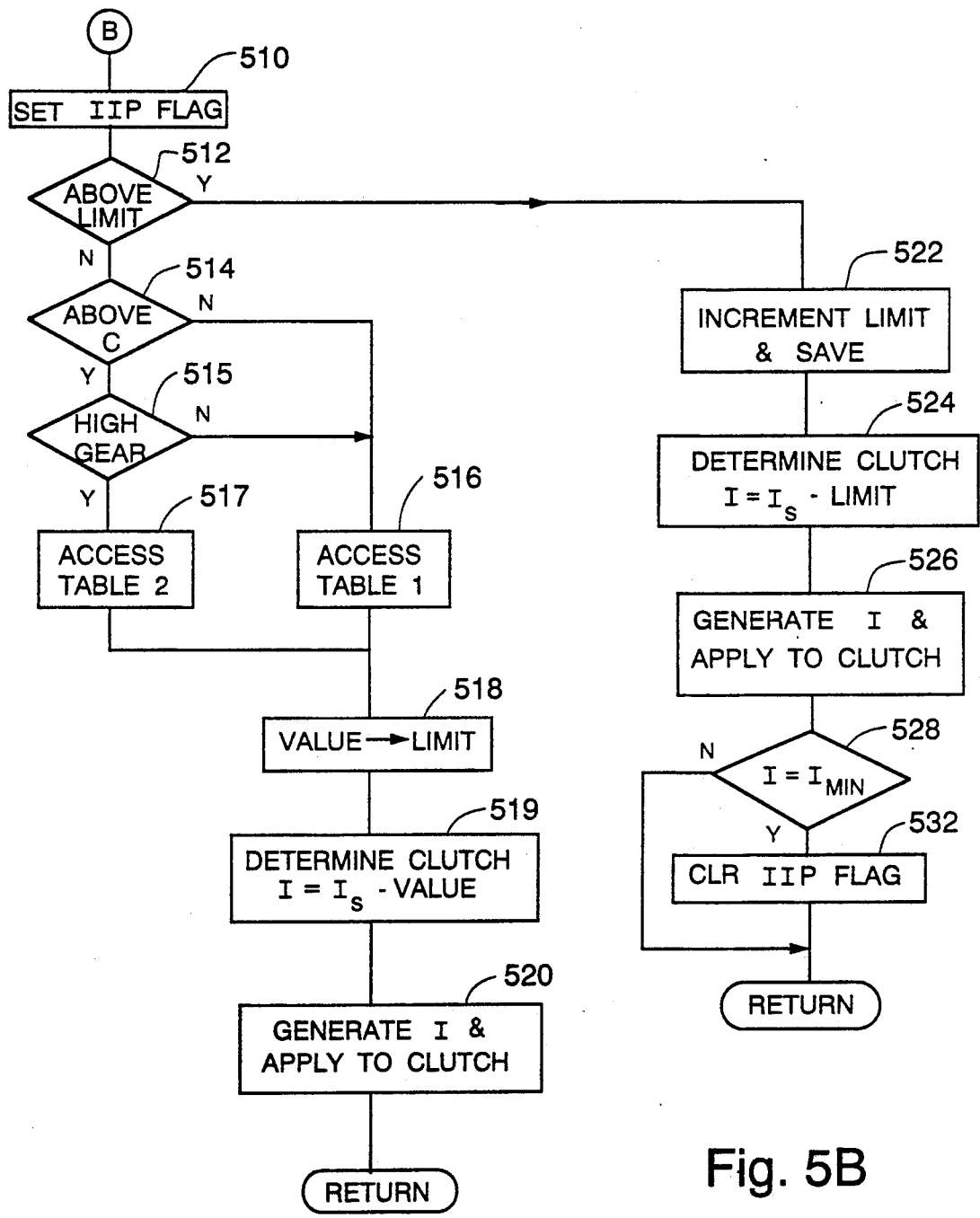

If the test at step 504 indicates that the pedal is not above the limit point the program branches to the inching control routine shown in FIG. 5B where it sets an Inch In Progress flag (IIP) at step 510. On the other hand, if the test at step 504 indicates that the clutch pedal is above the limit point, a test is made at step 506 to determine if the IIP flag is set. If it is set, the program branches to step 510. If it is not set, the program continues in its normal course, testing the other inputs to the microprocessor.

For purposes of the following description, it is assumed that the clutch pedal 3 is initially fully depressed when the output of potentiometer 3' is sensed at step 500. Step 502 is executed and the test at step 504 proves false so that the program branches to step 510 where the IIP flag is set. At step 512 the pedal position value produced at step 502 is again tested to see if the pedal is in a position above the limit position for the present gear. Under the assumed condition the test proves false and the program moves to step 514.

At step 514, the pedal position value developed at step 502 is compared with a stored value which corresponds to a value which would be developed at step 502 if the pedal were in the position corresponding to point C. Since it is assumed that the pedal is fully depressed, the test at step 514 proves false and the program moves to step 516 where the pedal position value is used to access a table having 256 addresses, each storing a modulation value.

At step 518, the value read from the table is saved in a register or memory location LIMIT for possible subsequent use when the clutch pedal is released to a position above the limit position L or L' as subsequently described.

Since there is a different stored digital value $I_S$ for each of the clutches 81, 82 and 83, step 519 first determines which of these clutches is active, fetches from memory the value $I_S$ for the active clutch and subtracts from $I_S$ the value read from the table at step 516. The resulting digital value I is then used at step 520 to generate a pulse width modulated signal I which is applied to the active clutch.

After step 520 is executed, the program returns to the routine of FIG. 5A at the step which follows step 506. It will be understood that the microprocessor continues to output the signal I even after the program leaves step 520, this being accomplished by circuits within the microprocessor as is well known in the art. At the next interrupt the program is repeated. A pedal position value is developed at step 502 and at step 516 the position value accesses the table to obtain a value for modulating I by modifying $I_S$ at step 519. These operations continue as long as the clutch pedal position is below the pedal position corresponding to point C. The only difference is that as the pedal moves upwardly, different addresses in the table are accessed at step 516 to read increasingly larger values from the table.

When the pedal has been released such that it is above the position corresponding to point C, this condition is detected at step 514 and the program moves to step 515 where the present gear register is checked to determine if the active gear is a low gear or a higher gear. If it is a low gear, the program moves to step 516 and continues as previously described.

If the test at step 515 shows that the active gear is a high gear then step 517 is executed to read a value from the high gear table. At step 518 the value is saved at LIMIT and at step 519 is subtracted from the digital representation of $I_S$ for the active clutch to obtain I. At step 520 the pulse width modulated signal I is generated and applied to the appropriate clutch 81, 82 or 83.

Thus, when a low gear is the active or preselected gear and the clutch pedal position is above point C but below point L, table 1 is accessed each time the routine is executed and the value read from table 1 is used to derive the pulse width modulated signal I. The values read from table 1 during this interval increase generally linearly as the clutch pedal is released.

On the other hand, when a higher gear is the active or preselected gear and the clutch pedal position is above point C but below point L', table 2 is accessed each time the routine is executed and the value read from table 2 is used to derive the pulse width modulated signal I. The values read from table 2 during this interval all have the same magnitude hence the clutch pressure remains constant as the clutch pedal moves between the positions corresponding to C and L'.

When the active gear is a low gear and the clutch pedal is released above point L, or the active gear is a high gear and the clutch pedal is released above point L', the microprocessor 1 assumes full control and rapidly increases the clutch pressure to its maximum value. This may be accomplished as follows.

After the clutch pedal position signal has been digitized at step 502, the above limit test made at step 504 proves true. The program thus moves to step 506 and tests the Inch In Progress flag. Since this flag is still set, the program moves to FIG. 5B as before.

At step 512, the above limit test is again performed and proves true. The program then executes step 522 to increment the value saved in the LIMIT register when step 518 was last executed. The incremented value is saved in the LIMIT register.

Next, the program determines which gear is the active gear, reads the calibration value $I_S$ for the active clutch 81, 82 or 83, and subtracts the value in the LIMIT register from $I_S$ to obtain the digital value I.

At step 526 the digital value of I is used to generate the pulse width modulated current signal I and this signal is applied to the active clutch. As explained above, the signal I continues to be applied to the clutch solenoid even after the program leaves step 526.

At step 528, the digital value of I produced at step 524 is compared to $I_{MIN}$ where $I_{MIN}$ is the value of I which, when converted to its pulse width modulated form and applied to the clutch solenoid, results in maximum hydraulic clutch pressure. Assuming $I \neq I_{MIN}$, the program does not clear the IIP Flag.

Since the IIP Flag has not been cleared, the next time the microprocessor executes step 506, the program again branches to the inching control routine shown in FIG. 5B to re-execute the loop comprising steps 522, 524, 526 and 528 with the value in the limit register being incremented on each execution of the loop. This results in a progressively smaller value of I being produced at step 524 so that an increasing clutch pressure is produced as indicated in FIG. 6. The slope of the increase is determined by the incrementing value used at step 522 and the time interval between executions of the inching control routine shown in FIG. 5B. The values of these parameters should be chosen such that the maximum clutch pressure is reached in about 1-2 seconds. The slope should not be so steep as to cause an excessive "jerk" as the microprocessor assumes control at point L or L' of FIG. 4.

The inching control routine terminates when the hydraulic pressure applied to the clutch reaches its maximum value, that is, when I reaches a minimum value. This is detected at step 528 when the value of I produced at step 524 is compared with a digital value of $I_{MIN}$. The program then clears the Inch In Progress flag and returns to the main program routine.

It will be understood by those skilled in the art that the modulation of I to increase clutch pressure within the second range from B to L, as shown in FIG. 4, need not be linear. It has been found that a curvilinear function with a progressively increasing slope from B to L provides a more favorable operation of the vehicle. Furthermore, one skilled in the art will readily understand that other non-linear functions can be adapted to provide a desired operational characteristics of the vehicle.

It will be understood that the method of clutch control described above may be practiced with other apparatus, and variations may be made in the disclosed method without departing from the spirit and scope of the invention as defined by the appended claims.

Having thus described the invention, what is claimed is:

1. In a power shift transmission system having an input shaft selectively driving an output shaft through clutches and gear means providing a plurality of gear ratios, at least one clutch being an inching clutch, a control means for selectively applying actuation signals to said clutches to select one of said gear ratios to control the transfer of torque from the input shaft to the output shaft, an operator actuated clutch pedal, movable between an up position and a down position, controlling signal means for producing an inching control signal whose magnitude is a function of the position of said clutch pedal, the control means being responsive to the inching control signal for modulating the actuating signal applied to said inching clutch, a method of inching clutch control comprising:

generating a modulation signal which is applied to said inching clutch to increase torque throughput of said inching clutch with respect to time and independent of clutch pedal position when said clutch pedal is between a first intermediate position and said up position, said first intermediate position being between said up position and said down position;

converting said inching control signal to a clutch control signal which is applied to said inching clutch to control torque throughput of said inching clutch as a function of clutch pedal position over an intermediate range of clutch pedal positions extending between said first intermediate position and a second intermediate position, said second intermediate position being between said down position and said first intermediate position; and when utilizing selected said gear ratios, converting said inching control signal to a clutch control signal having a fixed magnitude over a third range of clutch pedal positions extending from said first intermediate position to a third intermediate position located between said first and second intermediate positions.

2. In a power shift transmission system having an input shaft selectively driving an output shaft through clutches and gear means providing a plurality of gear ratios, at least one clutch being an inching clutch, a control means for selectively applying actuation signals to said clutches to select one of said gear ratios to control the transfer of torque from the input shaft to the output shaft, an operator actuated clutch pedal, movable between an up position and a down position, controlling signal means for producing an inching control signal whose magnitude is a function of the position of said clutch pedal, the control means being responsive to the inching control signal for modulating the actuation signal applied to said inching clutch, a method of inching clutch control comprising:

generating a modulation signal which is applied to said inching clutch to increase torque throughput of said inching clutch with respect to time and independent of clutch pedal position when said clutch pedal is between a first intermediate position and said up position, said first intermediate position being between said up position and said down position;

converting said inching control signal to a clutch control signal which is applied to said inching clutch to control torque throughput of said inching clutch as a function of clutch pedal position over an intermediate range of clutch pedal positions extending between said first intermediate position and a second intermediate position, said second intermediate position being between said down position and said first intermediate position; and when said clutch pedal is in a position between said down position and said second intermediate position, applying to said inching clutch a control signal of constant magnitude regardless of the position of said clutch pedal.

3. In a power shift transmission having a plurality of gear speed ratios selectable by actuation of clutches, at least one of said clutches being an inching clutch responsive to the position of a clutch pedal for controlling the torque applied to an output shaft, the clutch pedal controlling means responsive to the position of the clutch pedal over a range of positions extending between a down position and an up position for producing an inching control signal, a method of controlling said inching clutch comprising the steps of:

for a first range of clutch pedal positions between said down position and said up position, converting said inching control signal to a second signal which varies as the clutch pedal moves through said first range of clutch pedal positions;

applying said second signal to said inching clutch;

when said clutch pedal is above a limit position which is above said first range, generating a control signal which varies independently of the clutch pedal position;

applying said control signal to said inching clutch whereby the torque applied to said output shaft is increased; and, when said clutch pedal is in any position falling within a second range of clutch pedal positions, said second range being between the first range and said limit position, applying a clutch control signal of constant magnitude to said inching clutch if one of selected high gear sped ratios has been utilized.

4. The method of claim 3 further comprising the step of:

when the clutch pedal is in any position falling within said second range, and one of selected low gear speed ratios has been utilized, applying to said inching clutch a clutch control signal which is related to the clutch pedal position within said second range.

5. The method of claim 3 further comprising the step of:

when said clutch pedal is in a position between said down position and said first range of positions, applying to said inching clutch a control signal of constant magnitude regardless of the position of said clutch pedal.

6. In a power shift transmission having a plurality of manually selectable gear speed ratios engageable by actuation of clutches, at least one of said clutches being an inching clutch responsive to the position of a clutch pedal for controlling the torque applied to an output shaft, the clutch pedal controlling signal means responsive to the position of the clutch pedal over a range of positions extending between a down position and an up position for producing an inching control signal, a method of controlling said inching clutch comprising the steps of:

for a first range of clutch pedal positions defined by first and second intermediate positions located between said down position and said up position, converting said inching control signal to a second signal which varies as the clutch pedal moves through said first range of clutch pedal positions, said second signal varying between a first value corresponding to a low torque throughput for said inching clutch and a second value corresponding to a higher torque for said inching clutch;

varying said second value of said second signal as a function of the gear ratio selected such that the extent of variation of said second signal over said first range of clutch pedal positions is variable;

applying said second signal to said inching clutch; wherein said second signal is varied at a first rate of change over a first portion of said first range of clutch pedal positions and said second signal is varied at a second rate of change over a second portion of said first range of clutch pedal position, said first portion extending from said first intermediate position to a third intermediate position located between said first and second intermediate positions, said second portion extending from said third intermediate position to said second intermediate position;

said second signal being varied at a second rate of change which is substantially zero, causing the torque throughput for said inching clutch to remain at a substantially fixed magnitude irrespective of the clutch pedal position until said clutch pedal is moved to said second intermediate position.

7. The method of claim 6, further comprising the steps of:

when said clutch pedal is above said second intermediate position, generating a control signal which varies independently of the clutch pedal position; and applying said control signal to said inching clutch whereby the torque applied to said output shaft is increased.

8. The method of claim 7 wherein the step of generating said control signal comprises generating a control signal which varies with respect to time.

9. The method of claim 8, further comprising the step of:

when said clutch pedal is in a position between said down position and said first range of positions, applying to said inching clutch an initial control signal of constant magnitude regardless of the position of said clutch pedal, said initial control signal corresponding to a minimum torque throughput for said inching clutch.

* * * * *